(Model.)
J. L. SHAW.
Cultivator.
No. 240,192.                              Patented April 12, 1881.
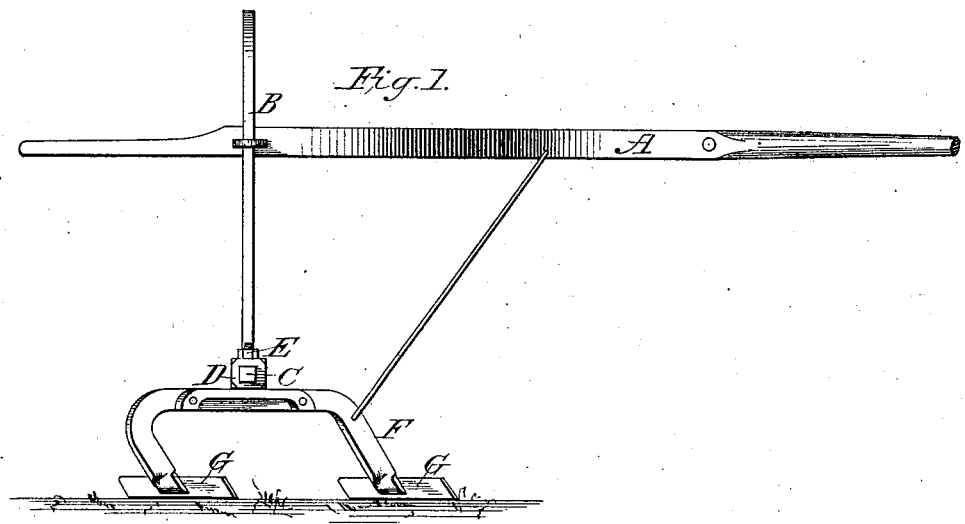
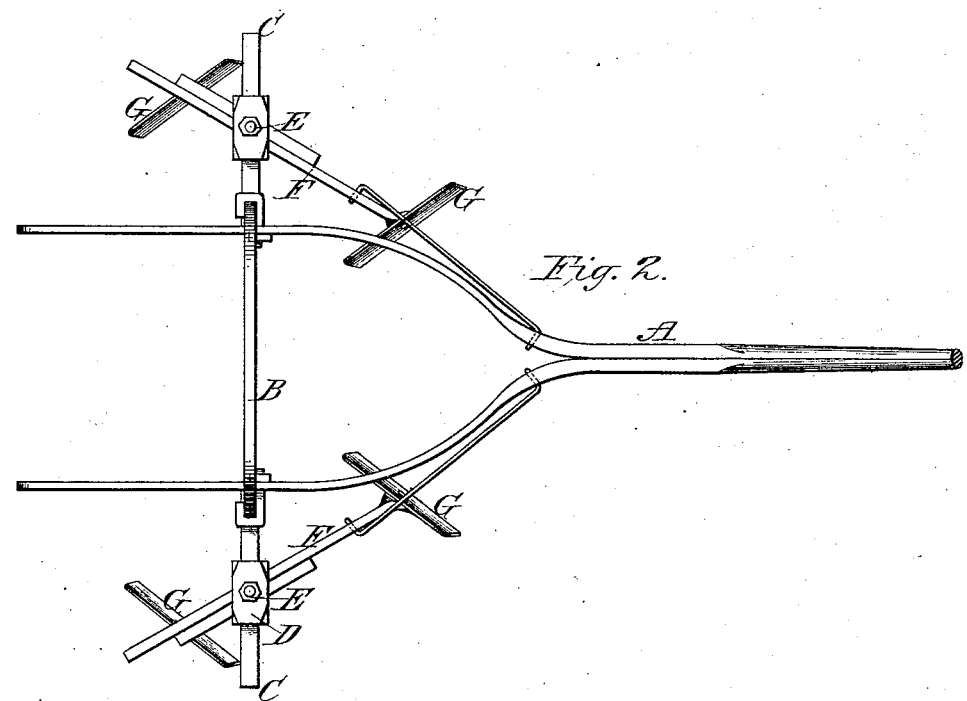
Witnesses:
John N. Lee
C T Bowman
Inventor:
James L. Shaw

UNITED STATES PATENT OFFICE.

JAMES L. SHAW, OF PRAIRIE CENTRE, ILLINOIS.

CULTIVATOR.

SPECIFICATION forming part of Letters Patent No. 240,192, dated April 12, 1881.

Application filed March 19, 1881. (Model.)

*To all whom it may concern:*

Be it known that I, JAMES L. SHAW, of Prairie Centre, in the county of La Salle and State of Illinois, have invented a new and useful Improvement in Cultivators, which improvement is fully set forth in the following specification, reference being had to the accompanying drawings.

This invention relates to that class of cultivators known as "gophers," and which are distinguished from the regular corn-cultivators by having a much lighter frame, having no wheels, and having scrapers instead of pointed shovels, the object of the gopher being not to cut into the soil and turn it over, but simply to remove the weeds, and to scrape away the soil from between the rows of corn and bring it toward the cornstalks, heaping it up on both sides, thus imitating closely the work of a hoe.

Gopher-cultivators are made single and double. My invention relates to the double variety; and it consists in the combination of an arch straddling the corn with a slide on each side, whereto are fastened the scraper-beams. This is a novel feature in gophers, since the scrapers have heretofore been attached to the frame of the machine, there being no arch, and the legs carrying the scrapers had to be comparatively strong and heavy.

As it is important that a gopher should be very light, for the reason that it cannot be steered like a plow, but must be moved bodily to change its direction, it follows that in reducing its weight by a new mode of construction a great improvement is effected; but there is also the additional advantage that there is nothing to hide the cornstalks from the view of the operator, and he is therefore better enabled to do good work. The machine being thus simplified, it can also be constructed cheaper than the old style.

I do not, however, claim as my invention the arch, for itself, as it may possibly have been used in gophers before; nor do I claim the iron beam carrying the scrapers, which I know to be old; but my invention consists in the cast-iron slides moving on a square or round shank, and in combining the same with the scraper-beams, and with the arch.

The machine is illustrated more in detail in the vertical view, Figure 1, and in the horizontal view, Fig. 2.

The tongue A is made of one piece of timber, forked so as to be bolted to each side of the arch B. This arch is made of flat iron, except the lower horizontal parts, C C, which are square, and on which fit the two cast-iron slides D D, fastened to any point thereon by the set-screws E E. To these slides D D are fastened, by rivets or bolts, the two scraper-beams F F, carrying each two scrapers, G G G G, placed in the ordinary position of gopher-scrapers.

I claim as my invention—

In a gopher-cultivator, the combination, with the beams F F and the arch B, of the blocks or slides D D, carrying the said beams, and secured adjustably upon the horizontal ends C C of the arch, substantially as shown and described.

JAMES L. SHAW.

Witnesses:
P. TALBOT,
JAS. McMANUS.